May 26, 1959 B. NIEDERMAN ET AL 2,888,652

ELECTRICAL FILTER

Filed June 15, 1954 2 Sheets-Sheet 1

INVENTORS
Bernard Niederman
Leonard G. Chase
BY
Mueller & Aichele
ATTYS.

May 26, 1959 B. NIEDERMAN ET AL 2,888,652

ELECTRICAL FILTER

Filed June 15, 1954 2 Sheets-Sheet 2

INVENTORS
Bernard Niederman
BY Leonard G. Chase
Mueller & Aichele
ATTYS.

United States Patent Office 2,888,652

Patented May 26, 1959

2,888,652

ELECTRICAL FILTER

Bernard Niederman and Leonard G. Chase, Chicago, Ill., assignors to Motorola, Inc., Chicago, Ill., a corporation of Illinois Application June 15, 1954, Serial No. 436,910

1 Claim. (Cl. 333—70)

This invention relates generally to electric wave filters and more particularly to a passive filter which includes a plurality of filter sections which are sealed to prevent change of the characteristics thereof.

It is general practice in the electronics field to incorporate combinations of resistive and reactive elements in a filtering circuit for selecting signals of certain frequencies and attenuating signals of other frequencies. To maintain exacting characteristics as often required for example in highly selective radio communication equipment, it is necessary that the values of the various components used in a filter system remain constant. Such factors as humidity, vibration, aging and heat often adversely affect the values of filter components.

In the co-pending application of Bernard Niederman, Serial No. 155,683, filed April 13, 1950, now Patent No. 2,738,466, there is disclosed a bandpass filter system which is sealed in such a fashion so as to be substantially immune to variations caused by the above-named factors. Structures in accordance with said application have been highly successful in commercial use. The present invention is directed to an improvement and simplification of the construction of the filter described in that application.

It is an object of the present invention to provide an improved construction for electrical bandpass filters which are sealed in plastic material to prevent change in the electrical characteristics thereof.

Another object is to provide a simple and inexpensive construction for individual filter sections which may be combined to provide complete filter structures of desired configurations and characteristics.

A further object of the invention is to provide an improved casing structure for an electrical filter which allows adjustment of components thereof prior to permanently sealing the entire unit in a suitable material.

Still another object of the invention is to provide an improved casing for electrical filter elements which may be conveniently arranged and sealed with other similar casings in a minimum of space.

A feature of the invention is the provision of an electrical filter formed of a plurality of sections each including electrical elements in a casing sealed in a suitable compound, with all the units interconnected and provided in a housing and the entire structure further sealed to fix the characteristics thereof.

Another feature of the invention is the provision of an electrical filter formed of a plurality of sections each including an enclosed casing composed of electrically conductive material having electric filter elements sealed in a suitable material therein, the casing having one open side through which adjusting means of an element extends to facilitate adjustment thereof prior to complete sealing of the entire contents of the casing. Conductors may also extend from the open side of the casing and a support bracket may be provided for the adjusting means which may be a core in a coil unit.

Further objects, features and the attending advantages thereof will be apparent upon consideration of the following description when taken in conjunction with the drawings in which.

In practicing the invention there is provided an electrical filter formed of a plurality of sections, each comprising a casing composed of electrically conductive material with one open side. Within the casing are contained an inductor with a hollow tube through the center thereof in which core means may be adjustably positioned, and a condenser. Along one side and across the open side of the casing a support bracket may provide a fixed mount for the variable core means of the inductor to permit positioning of the same in a desired relation within the inductor. Sealing compound is poured into the casing to seal all but the interior of the hollow tube and the adjusting means so that adjustment may be effected after secure positioning of the components. A plurality of filter sections are installed in a suitable housing and connected to form a complete filter of desired characteristics. Additional sealing compound is poured around all the sections, and within the hollow tubes, to completely seal and fix the entire structure. The casings for the individual sections may be of rectangular or other configuration which facilitate the inclusion of a plurality of sections in a compact housing.

Figures 1, 2:
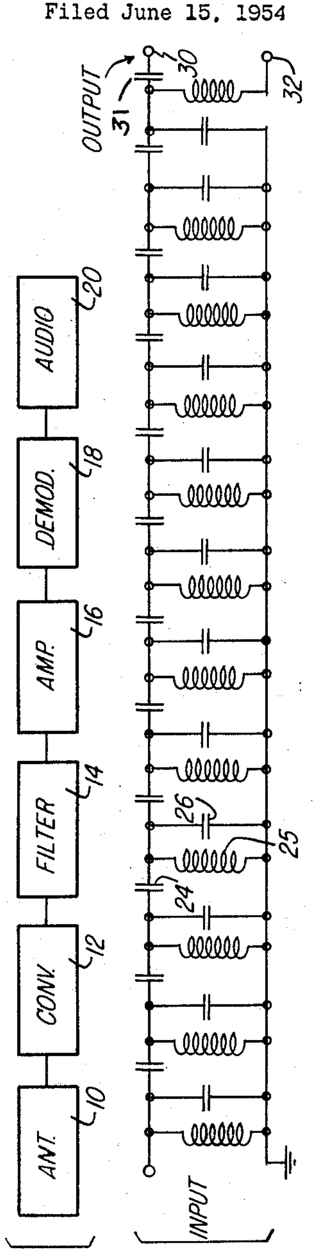
Fig. 1 is a block diagram of a radio receiver incorporating the filter of the present invention.
Fig. 2 is a schematic diagram of a filter which may be constructed in accordance with the invention.

Referring now to the drawings, Fig. 1 shows a block diagram of a wave signal receiver. The receiver includes an antenna 10 for intercepting a wave signal which is coupled to a converter stage 12 including one or more mixer stages for heterodyning the received signal to produce a desired intermediate frequency signal. This intermediate frequency signal is then applied to the filter unit 14 which is a highly selective electrical filter and will be described in more detail presently. The filter unit is coupled to amplifier 16 to amplify the intermediate frequency signal to a desired level. The signal is then coupled to the demodulator 18 where it is detected to produce an audio valve which is impressed upon the audio stage 20 for further amplification and any desired utilization thereof. The filter unit 14 comprises a series of electrical components constructed in accordance with the present invention to have a desired frequency selecting characteristic.

Fig. 2 is a schematic diagram showing the electrical connection of a group of components which will comprise a bandpass filter suitable for use in a receiver as illustrated in Fig. 1. This filter circuit is shown as including twelve sections each having a parallel combination of an inductor and a capacitor, here labelled 25 and 26, respectively. The sections all have one terminal thereof connected to a point of reference potential while the other terminal of each parallel combination is joined through a coupling capacitor such as capacitor 24 to a corresponding terminal of an adjacent parallel combination. An input signal may be impressed across one parallel combination of inductor and capacitor and the output taken from terminals providing either high or low impedance matching. The terminal 30 provides a high impedance output and is connected through capacitor 31 to the final coupling capacitor while one side of the final inductor, that is, terminal 32, is connected to ground. When a low impedance output is desired, connection is made to terminal 32 which is the connection of the last inductor in the filter unit that is otherwise grounded, and terminal 30 is left unconnected.

Figure 3:
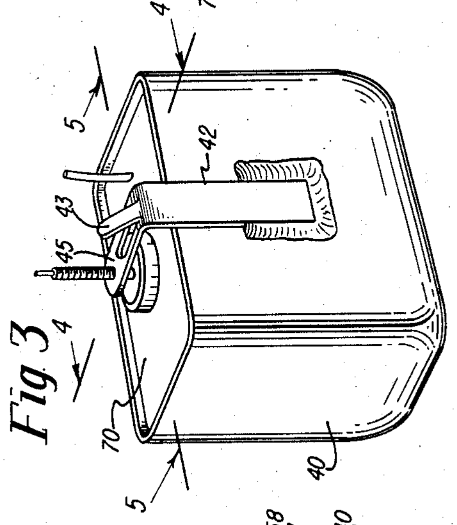
Fig. 3 is a perspective view of a filter section with the electrical components contained therein.

The filter circuit in accordance with the invention and as illustrated in Fig. 2 is constructed in sections, one of which is illustrated in Fig. 3. This comprises a casing 40 composed of electrically conductive material and formed in a rectangular shape with one side thereof open. Casings with other cross sections such as round, L-shaped, or the like may also be used to provide an overall unit of a desired configuration. A supporting lug or bracket 42 is shown affixed to one side of the casing and it has a bent portion extending over the open side of the casing. The bracket includes a punched out lip portion 43 in the section which extends over the open side of the casing which serves as a convenient electrical soldering lug for connection to the casing.

Figure 5:
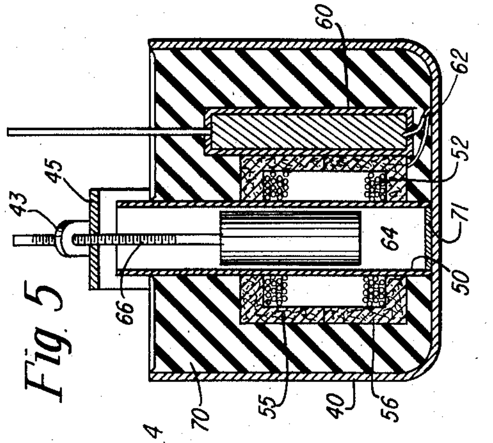
Fig. 5 is a sectional view along the line 5—5 of Fig. 3.
Figure 4:
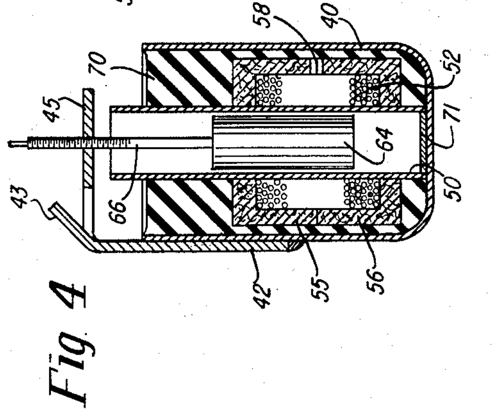
Fig. 4 is a sectional view along the line 4—4 of Fig. 3.

Figs. 4 and 5 are sectional views of the filter section illustrated in Fig. 3 and more clearly show the mounting of the components within the casing 40. Supported on a suitable tubular form 50 is the coil 52 composed of wire wound thereupon. Surrounding the wire is a two-piece shell composed of powdered iron or the like. Leads from the coil 52 may pass through a notch such as 58 at the junction of the top and bottom portions of the shell. These coil leads are shown in Fig. 5 to be soldered to the leads of capacitor 60 and one lead of this capacitor is shown to be soldered to the casing 40 at point 62. Thus one connection to the coil and condenser may be made through the casing 40 and support bracket 42 to the lug 43. The other lead from the condenser 60 may extend upward and out of the open side of the casing 40 so that external connection may be made thereto.

Within the tubular form 50 is a metallic slug or core 64 which is secured to the threaded rod 66. This threaded rod engages a tapped hole in the bent portion 45 of the supporting bracket so that by turning the rod 66 the slug 64 may be positioned axially along and within the tubular form 50. This provides variation in the inductance of the coil 52 and therefore tunes the circuit combination of this coil and the condenser 62. It is also possible to provide a threaded engagement between the core 64 and the form 50 so that the bracket 42 and rod 66 may be eliminated.

Figure 6:
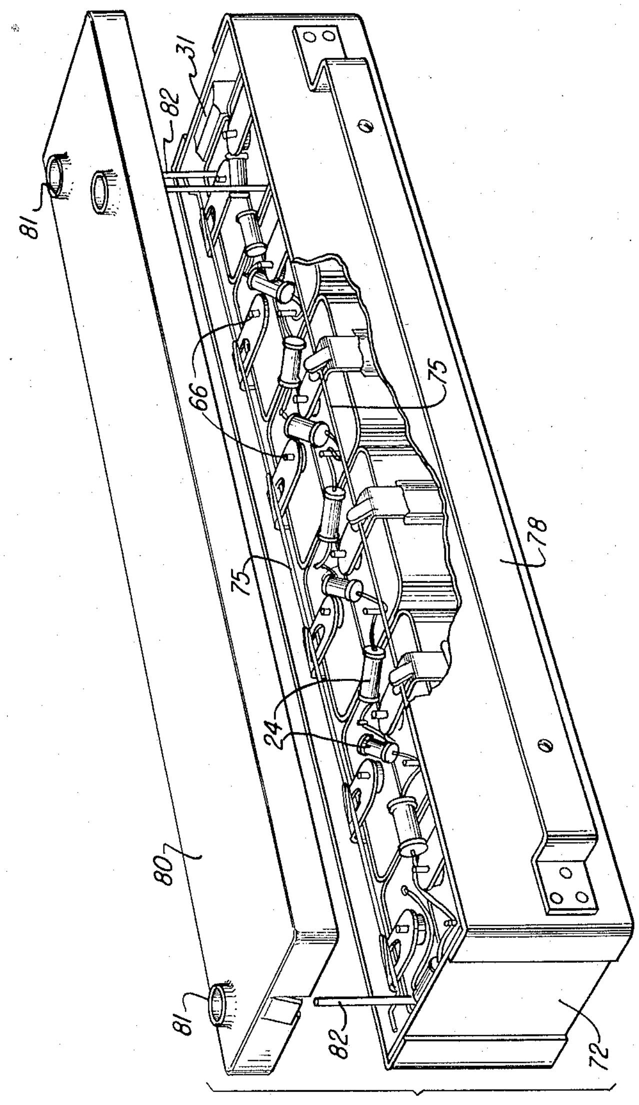
Fig. 6 is a perspective view of a housing containing a plurality of filter sections such as the one shown in Fig. 3.

After the coil, condenser and mounting brackets have been secured with respect to the casing and the connection of the coil and condenser made to the casing, suitable plastic sealing material 70 is poured around the components to fasten them in a fixed position. An insert such as disc 71 may be used in one end of form 50 to exclude the sealing material from the bottom thereof. With the construction of the filter section completed to this extent, a plurality of such sections may be installed in a suitable housing such as illustrated in Fig. 6 where the proper electrical connection may be made. It may be noted that capacitor 24 is secured to the connection extending from the open side of the filter section which mechanically mounts the condensers as well as electrically connects them. The section casings as shown all have their supporting brackets facing an outer wall of the housing 72 so that a ground bus 75 may be soldered along the raised lip of the supporting bracket and further soldered to the housing 72 for establishing the ground connection to the entire filter unit. There is provided also a mounting bracket 78 secured to the housing and cover 80 for completely enclosing the housing. Apertures 81 are located in this cover through which the connection leads 82 for the input and output of the complete filter unit may extend. These connections consist of suitable wire leads imbedded in the sealing material of the filter sections located at the ends of the housing.

With the completed filter unit thus wired, adjustment of the threaded rods 66 may be made to tune the inductors and thereby align the completed unit so that it possesses the desired electrical characteristics. It should be noted that at this time all of the components are in their proper positions and therefore the tuning may account for all interaction among the various components as well as the effect of the sealing material. At this point in the assembly of the filter unit additional sealing material may be poured into the housing to completely surround all components contained therein and secure them in fixed mechanical relation to one another.

Figure 7:
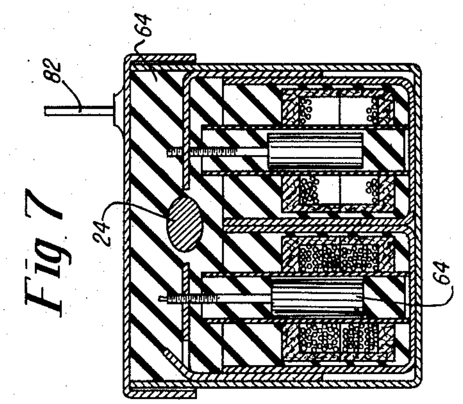
Fig. 7 is a cross-sectional view of the housing of Fig. 6.

In Fig. 7 a cross-sectional view of the completed housing of Fig. 6 is shown, and there it may be seen that the sealing material completely surrounds and impregnates all the components including the interior of the tubular core to maintain the tuning slug in its position.

Figure 8:
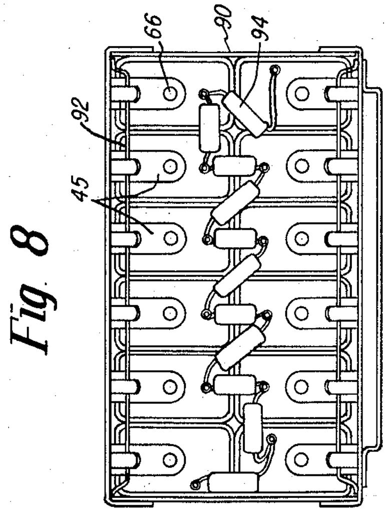
Fig. 8 is the top view of a housing containing a plurality of filter sections positioned in a different manner, with the supporting brackets mounted in an alternative position on the filter section casing.

Fig. 8 shows an alternative assembly of the filter unit which includes a housing 90 in which the filter sections are inserted with the width of the filter section casings extending lengthwise of the housing 90. Thus it may be seen that the rectangular construction of the casing 40 permits assembly of the unit in a different configuration so that the completed filter unit may fit in a space of different dimensions. In this alternative construction of the unit the support brackets are mounted on the short side of the casing so that the raised lips are in a line along the sides of the housing 90 and may thereby be simply joined by a ground bus 92 which is then soldered to the housing 90 as was the ground bus in the previously described construction. Once again capacitors such as capacitor 94 may electrically connect the filter section to provide the desired characteristics in the completed unit and a cover may be installed upon the housing 90 to completely enclose the unit when it is sealed with the sealing material. In order to provide a filter unit of desired shape it is also possible to combine the filter sections in other relationships.

It is apparent then that these filter sections may be constructed up to the point of completion illustrated in Figs. 3 to 5 and then combined in the necessary number and configuration to provide suitable electrical characteristics and mechanical configuration for the circuit in which they are to be used. The filter section housing and associated brackets are simple and inexpensive to construct, yet this construction permits partial sealing of the contents of the casing while allowing adjustment of the electrical characteristics thereof prior to the final sealing operation to secure an entire group of the sections in a unit.

While a particular embodiment of the invention has been shown and described, changes may be made and it is intended to cover all such changes and modifications in the appended claims.

What is claimed is:

The method of constructing an electrical filter made up of a plurality of preformed sections each including a condenser and an inductor connected in parallel, with the inductor having turns of wire on a tubular insulating form and core means adjustably positioned therein, and in which the sections are provided in a conducting shielding housing and interconnected and sealed to form a fixed unit, said method including the steps of, providing plastic material having a liquid state and a solid state in which the plastic material is rigid, forming preformed filter sections by applying said plastic material in the liquid state to an inductor and a condenser, allowing said plastic material to set to hold said inductor and capacitor in assembled relation with the core means of the inductor being free to move and accessible from one end of the preformed section, said plastic material affecting the electrical characteristics of the filter section, adjusting each filter section to provide predetermined characteristics, placing a plurality of preformed filter sections in the housing with the core means of each section accessible for adjustment, electrically connecting the sections into a filter network, electrically testing the filter network to determine the electrical characteristics thereof, mechanically adjusting the position of the core means of at least one inductor while testing said filter network and continuing such adjustment until the testing indicates that the filter network has predetermined electrical characteristics, pouring plastic material in the liquid state in the housing structure with such plastic material covering the filter sections, surrounding the connections between the sections and engaging the core means, and allowing said additional plastic material to solidify to fix the positions of the filter sections and the core means thereof, said solid plastic material completely surrounding the electrical elements forming the filter network so that the electrical characteristics of the filter and the mechanical characteristics thereof are fixed by said rigid solid plastic material.

References Cited in the file of this patent

UNITED STATES PATENTS

| | | |
|---|---|---|
| 1,227,113 | Campbell | May 22, 1917 |
| 1,315,365 | Hamm | Sept. 9, 1919 |
| 1,597,901 | Kent | Aug. 31, 1926 |
| 1,836,260 | Lewis | Dec. 15, 1931 |
| 1,931,043 | Taylor | Oct. 17, 1933 |
| 2,136,609 | Butterfield et al. | Nov. 15, 1938 |
| 2,304,667 | Taylor | Dec. 8, 1942 |
| 2,391,038 | Rifenbergh | Dec. 18, 1945 |
| 2,455,875 | Peterson et al. | Dec. 7, 1948 |
| 2,552,999 | Pannell et al. | May 15, 1951 |
| 2,630,560 | Earl et al. | Mar. 3, 1953 |
| 2,738,466 | Niederman | Mar. 13, 1956 |